United States Patent [19]
Cziptschirsch

[11] Patent Number: 5,297,838
[45] Date of Patent: Mar. 29, 1994

[54] CONVERTIBLE TOP FOR VEHICLE

[75] Inventor: Kurt Cziptschirsch, Wuppertal, Fed. Rep. of Germany

[73] Assignee: Gebr. Happich GmbH, Wuppertal, Fed. Rep. of Germany

[21] Appl. No.: 973,828

[22] Filed: Nov. 5, 1992

[30] Foreign Application Priority Data

Jun. 5, 1992 [DE] Fed. Rep. of Germany ....... 4218607

[51] Int. Cl.$^5$ .............................................. B62D 25/06
[52] U.S. Cl. ..................................... 296/214; 296/39.1
[58] Field of Search ............. 296/214, 107, 116, 39.1, 296/39.3

[56] References Cited

U.S. PATENT DOCUMENTS

| | | | |
|---|---|---|---|
| 2,680,647 | 6/1954 | Hosking | 296/214 |
| 3,953,067 | 4/1976 | Isola | |
| 4,175,784 | 11/1979 | Schatzler et al. | 296/214 |
| 4,323,276 | 4/1982 | Hira et al. | 296/214 |
| 4,933,225 | 6/1990 | Abe | 296/214 X |
| 4,957,797 | 9/1990 | Maeda et al. | 296/214 X |

FOREIGN PATENT DOCUMENTS

| | | |
|---|---|---|
| 0377813 | 11/1989 | European Pat. Off. . |
| 1931090 | 7/1965 | Fed. Rep. of Germany . |
| 1933970 | 9/1965 | Fed. Rep. of Germany . |
| 1580827 | 2/1966 | Fed. Rep. of Germany . |
| 1944652 | 5/1966 | Fed. Rep. of Germany . |
| 1953893 | 1/1967 | Fed. Rep. of Germany . |
| 6944515 | 5/1970 | Fed. Rep. of Germany . |
| 2607374 | 2/1976 | Fed. Rep. of Germany . |
| 4039583 | 12/1990 | Fed. Rep. of Germany . |
| 4127387 | 8/1991 | Fed. Rep. of Germany . |
| 185346 | 10/1983 | Japan ................. 296/214 |
| 184542 | 7/1988 | Japan ................. 296/39.1 |
| 208145 | 8/1990 | Japan ................. 296/214 |
| 1214948 | 12/1970 | United Kingdom ........... 296/214 |

Primary Examiner—Joseph D. Pape
Attorney, Agent, or Firm—Ostrolenk, Faber, Gerb & Soffen

[57] ABSTRACT

A convertible top includes a canopy arranged below a cover material. The canopy is comprised of a knitted fabric comprising two knitted external webs and a spacing structure disposed between the webs. The spacing structure is formed by a plurality of threads connecting the webs together. The longitudinal edges of the fabric are developed with integrated channels which are without any interposed spacing structure therein, and which receive longitudinal tensioning elements for the canopy. On the top side of the canopy and extending in the transverse direction of the canopy there are provided connecting elements by which the canopy can be fastened to hoops disposed on the cover material by clip mounting.

15 Claims, 3 Drawing Sheets

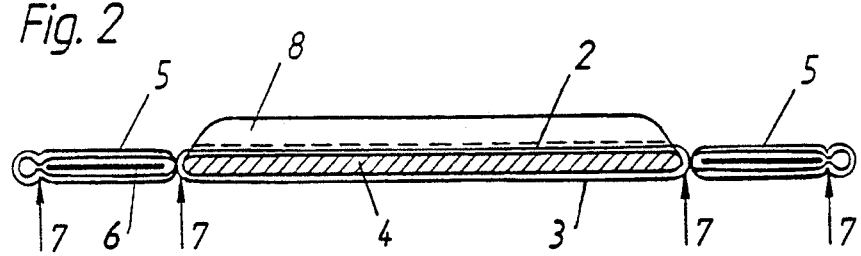
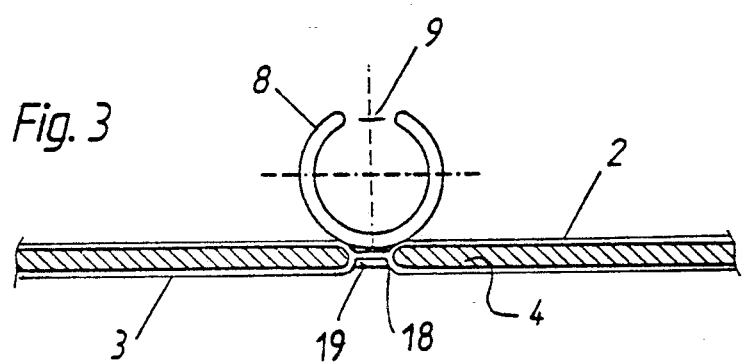
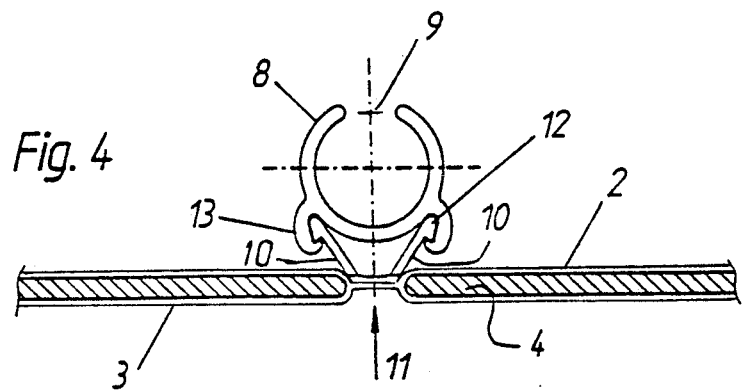
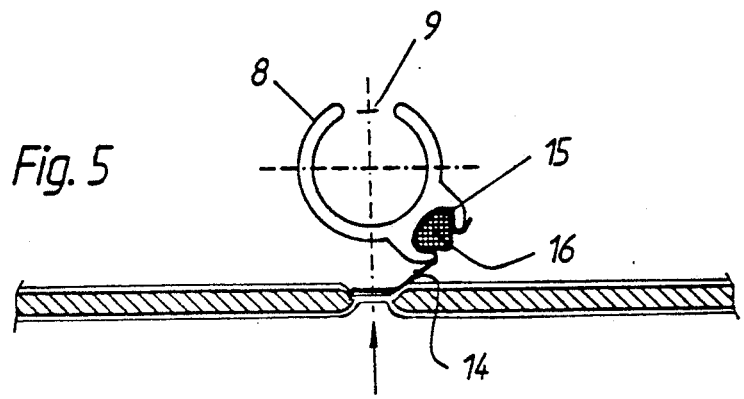

CONVERTIBLE TOP FOR VEHICLE

BACKGROUND OF THE INVENTION

The present invention relates to a convertible top for a convertible automobile coupe having a canopy which can be arranged within a cover material.

A top of this type is known from Federal Republic of Germany OS 26 07 374. It has a roof inner covering which is equipped with loops for attachment to hoops. The loops are formed of a thick, resilient material, for instance, non-woven polyester, which is cut into strips and is connected to the inner covering by heat sealing or sewing to produce a loop into which a hoop is inserted. This development of the canopy or roof covering is unsatisfactory in view of its inconvenient manufacture and mounting.

SUMMARY OF THE INVENTION

It is an object of the present invention to simplify the manufacture and, in particular, the mounting and removal of the convertible coupe canopy and, in addition, to ensure that the canopy has acoustic as well as heat and cold insulating properties. Furthermore the canopy should rest cleanly against the edge of the convertible top even upon rapid travel, and not lift off from that edge.

In order to achieve this purpose, the canopy of the invention comprises a knitted fabric with two fabric webs on its outside top and bottom surfaces. A spacing structure is disposed between the webs and between the longitudinal edges of the knitted spacing fabric. That structure is developed with integrated channels along its longitudinally lateral edges, and without spacing structure between the webs in those channels, in order for the channels, to receive longitudinal tensioning elements for the canopy. In the transverse direction of the canopy, on its top, connecting elements are arranged by which the canopy can be fastened to hoops of a cover material by a clip attachment.

The canopy of the invention has various advantages. Equalization of moisture is achieved, particularly because the canopy is made of knitted fabric. Furthermore, heat and sound insulation are obtained. Annoying noise within the passenger space of the car is substantially reduced by acoustic insulation. The integrated channels on the longitudinal edges of the canopy receive longitudinal tensioning elements which oppose the lifting of the canopy off the side edges of the convertible top even when the vehicle is traveling rapidly. The connecting elements arranged on the canopy permit clip attachment to the hoops and thus permit substantial simplification in mounting of the canopy. The invention enables delivery of a top canopy as a complete installation unit, and the canopy furthermore has substantially better properties in use and has an attractive appearance.

In practicing the invention, it is contemplated that the connecting elements be sealed to the knitted fabric. This contributes substantially to simplifying manufacture.

In accordance with another development of the invention, the connecting elements are of C-shape such that each element has a slot extending in its lengthwise direction for mounting by clipping on the hoops. The connecting elements are simple and economical to manufacture and may, for instance, comprise extruded plastic bodies.

The connecting elements can be arranged directly on the canopy. However, it is also possible for the connecting elements to be attached to the knitted fabric via intermediate members, which increases the flexibility. In this case, the intermediate members are preferably each heat sealed to the fabric and are clipped to the connecting elements.

Further, the textile spacing fabric may comprise a heat sealable material, in particular one which is capable of high-frequency sealing. This simplifies a possible way of forming the longitudinal channels, in that the channels are formed by longitudinal seals which connect the webs of knitted fabric to each other.

Sealability can also be obtained by providing the canopy with transverse channels to receive heat sealing agents.

The invention, finally, can also be further perfected by providing the canopy with a cut-out having a rear window inserted in it.

Other features and advantages of the present invention will become apparent from the following description of the invention which refers to the accompanying drawings.

BRIEF DESCRIPTION OF THE DRAWINGS

FIG. 2 is a section along the line II—II of FIG. 1;

FIG. 3 is a section along the line III—III of FIG. 1;

FIG. 4 is a first modified embodiment, as compared with FIG. 3; and

FIG. 5 is a second modified embodiment, as compared with FIG. 3.

DETAILED DESCRIPTION OF THE PREFERRED EMBODIMENTS

Figure 6:
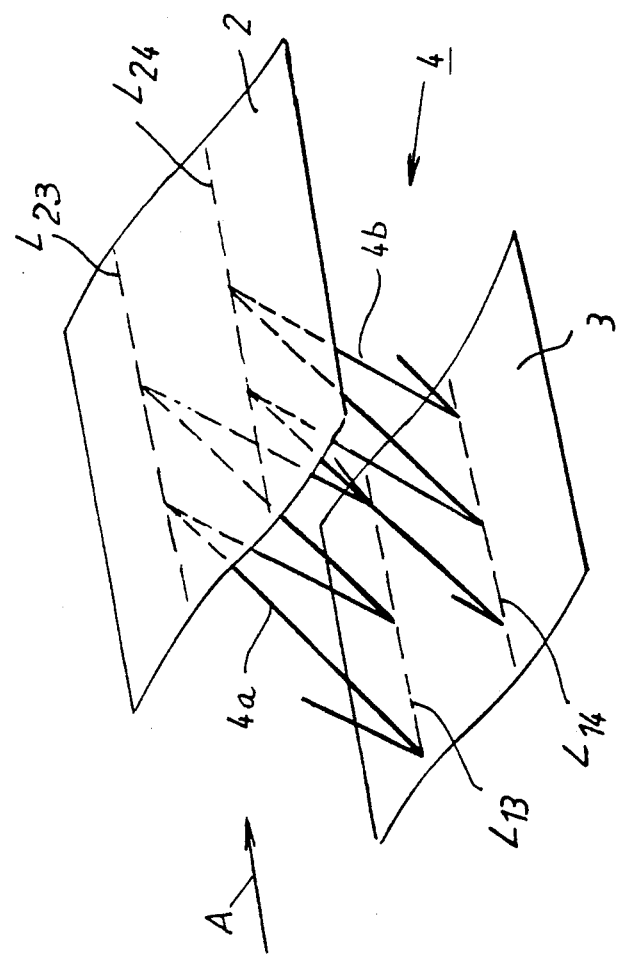
FIG. 6 is a perspective view of the fabric of the canopy of the present invention.

The convertible top canopy 1 of the invention comprises a knitted fabric having flat, parallel along its length, fabric webs 2 and 3 that define the inner and outer, external surfaces of the canopy and with a spacing structure 4 disposed between the webs. The webs 2, 3 and structure 4 define the composite fabric. As shown in FIG. 6, the spacing structure 4 comprises for instance, meshes having elastic monofilament threads 4a and 4b that connect the facing web surfaces together, as the threads are intermeshed alternately with each of the knitted webs 2, 3.

Channels 5 are provided along both longitudinal edges of the canopy 1. Each channel is empty of the spacing structure 4 so as to be able to receive a respective strip shaped longitudinal tensioning element 6. Knitting techniques can be used to form and enclose the channels 5. The channels 5, however, are preferably set off by high frequency radiation sealed seams 7. For this purpose, the textile spacing knitted fabric is capable of self sealing at least in individual regions thereof along its length, for instance, by means of PVC threads which are knitted into the fabric.

Figure 7:
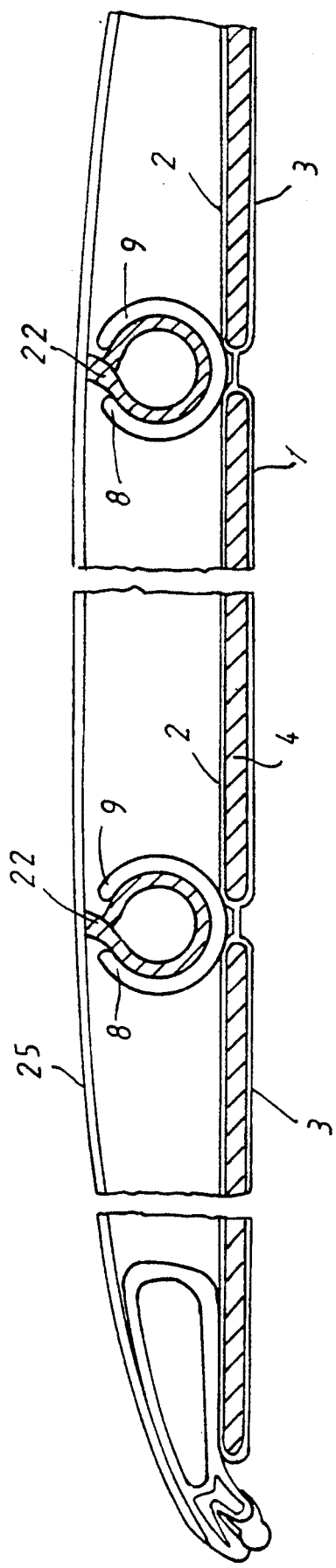
FIG. 7 is a cross-sectional side view of the convertible top of the present invention.

There are connecting elements 8 by which the canopy 1 can be fasted by clip mounting to hoops 22 which are arranged on a cover material 25 at the top side of the canopy, see FIG. 7. Each connecting element 8 is comprised of an extruded plastic body having a slot opening 9 extending in the longitudinal direction of the element, so that the sides defining the connecting element 8 can be spread apart. As shown in FIG. 3, the connecting element 8 can be attached directly to the canopy 1, preferably by high frequency radiation sealing. If the canopy material is one that cannot be sealed by high frequency, transverse channels 18 can be developed in the canopy 1 and sealing aids 19, for instance plastic strips, can be inserted into them. The aids 19 would be attached to the elements 8.

In the embodiment shown in FIG. 4, each connecting element 8 is fastened to the canopy 1 by two intermediate members 10. The intermediate members 10 are formed from an extruded plastic strip of sealable material. This enables production of a sealed attachment (arrow 11) to the canopy 1. The intermediate members 10 of FIG. 4 have respective detent noses 12 while the connecting element 8 of FIG. 4 have cooperating detent receptacles 13 so that a clip engagement is enabled between the element 8 and the member 10.

In the embodiment in FIG. 5, a strap 14 which is fastened to and is preferably sealed to the canopy serves as an intermediate member for attaching the connecting element 8 to the canopy 1. A lengthwise extending undercut recess 15 is developed on the connecting element 8. A filler strip 16 can be pushed into the recess 15, along with inclusion of the strap 14 in the recess.

Figure 1:
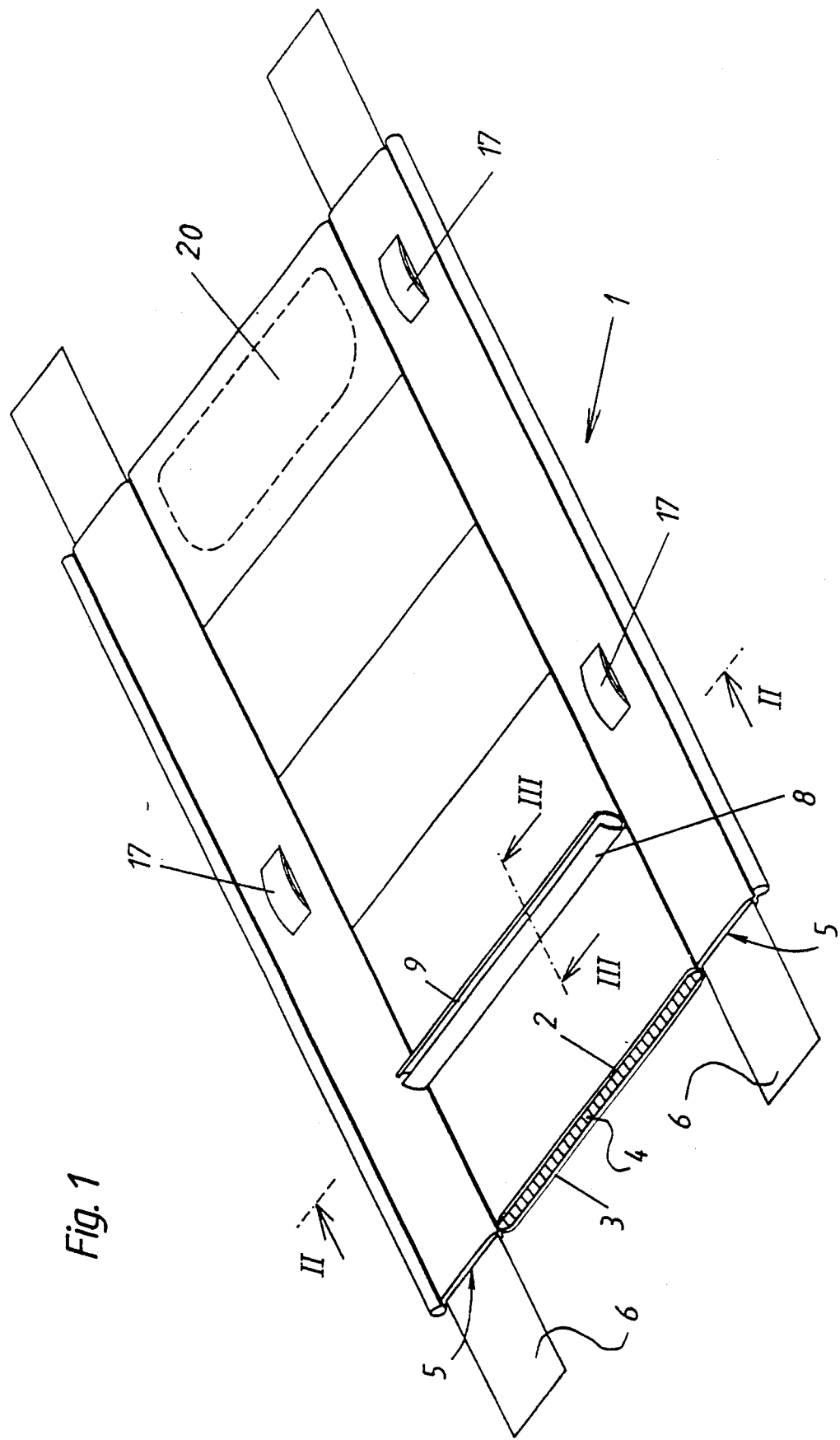
FIG. 1 is a top view of a completely formed canopy according to the invention.

A rear window 20 which can be inserted into an opening in the canopy is indicated in dashed lines in FIG. 1. Furthermore suspension eyes 17 are indicated in FIG. 1 in the region of the longitudinal edges of the canopy 1.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A convertible top for a vehicle having a canopy which can be arranged below a cover material, wherein the canopy is comprised of:
   a knitted fabric having two external webs of knitted material and a spacing structure between the webs, one of the webs forming a top side of the canopy;
   the fabric having opposite longitudinal edges and each edge having an integrated channel formed at the edge;
   longitudinal tensioning elements for the canopy received in the channels; and
   connecting elements extending in a transverse direction on the canopy are arranged on the top side of the canopy, by which the canopy can be fastened to hoops disposed on an inner surface of the covered material by clip mounting.

2. The convertible top of claim 1, wherein the external webs extend over the channels, and the spacing structure disposed between the webs does not extend into the channels.

3. The convertible top of claim 1, wherein the connecting elements are sealed to the knitted fabric.

4. The convertible top of claim 1, wherein the connecting elements are of C-shape, and each has a connecting element lengthwise extending slot for clip mounting to the hoops.

5. The convertible top of claim 1, further comprising intermediate members for connecting the connecting elements to the knitted fabric.

6. The convertible top of claim 5, wherein each intermediate member is sealed to the knitted fabric and is also clipped to the respective connecting element.

7. The convertible top of claim 1, wherein the knitted fabric comprises a sealable material.

8. The convertible top of claim 7, wherein the fabric comprises a sealable material which is sealable by high frequency.

9. The convertible top of claim 8, wherein each channel is formed and defined by a longitudinally extending sealed seam which extends longitudinally along the canopy and which connects the webs of knitted material to each other to define the channel toward the respective edge.

10. The convertible top of claim 5, wherein the canopy has transverse channels defined therein and means for sealing the intermediate members to the fabric.

11. The convertible top of claim 1, wherein the canopy has a cut-out for receiving a rear window inserted into the cut out.

12. The convertible top of claim 1, wherein each channel is formed and defined by a longitudinally extending sealed seam which extends longitudinally along the canopy and which connects the webs of knitted material to each other to define the channel toward the respective edge.

13. The convertible top of claim 1, further comprising at least one intermediate member for connecting each connecting element to the textile spacing knitted fabric.

14. The convertible top of claim 13, wherein each said intermediate member comprises a strap, and further comprises means for connecting said strap to the respective connecting element.

15. The convertible top of claim 1, wherein the spacing structure is formed by a plurality of threads connecting the webs of knitted material together.

* * * * *